US007974284B2

(12) United States Patent
Chen et al.

(10) Patent No.: US 7,974,284 B2
(45) Date of Patent: Jul. 5, 2011

(54) SINGLE AND DOUBLE TAGGING SCHEMES FOR PACKET PROCESSING IN A NETWORK DEVICE

(75) Inventors: Yih-Chuan S. Chen, San Jose, CA (US); Jeff Dull, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1007 days.

(21) Appl. No.: 10/874,550

(22) Filed: Jun. 24, 2004

(65) Prior Publication Data

US 2005/0008009 A1    Jan. 13, 2005

Related U.S. Application Data

(60) Provisional application No. 60/482,758, filed on Jun. 27, 2003, provisional application No. 60/527,823, filed on Dec. 9, 2003.

(51) Int. Cl.
*H04L 12/28* (2006.01)
*H04L 12/56* (2006.01)
*H04J 3/16* (2006.01)

(52) U.S. Cl. ......... 370/392; 370/397; 370/409; 370/469

(58) Field of Classification Search ............... 370/392, 370/389, 395.1, 474, 397, 409
See application file for complete search history.

(56) References Cited

U.S. PATENT DOCUMENTS

| 5,423,015 A | 6/1995 | Chung |
| 5,644,784 A | 7/1997 | Peek |
| 5,802,052 A | 9/1998 | Venkataraman |
| 5,831,980 A | 11/1998 | Varma et al. |
| 5,892,922 A | 4/1999 | Lorenz |
| 5,909,686 A | 6/1999 | Muller et al. |
| 6,119,196 A | 9/2000 | Muller et al. |
| 6,175,902 B1 | 1/2001 | Runaldue et al. |
| 6,829,651 B1 * | 12/2004 | Bass et al. ...................... 709/238 |
| 6,996,110 B1 * | 2/2006 | Amara et al. .................. 370/396 |
| 7,020,137 B2 * | 3/2006 | Kadambi et al. ............... 370/389 |
| 7,227,867 B1 * | 6/2007 | Ferguson et al. .......... 370/395.5 |
| 2001/0025321 A1 * | 9/2001 | Tang et al. ..................... 709/246 |
| 2002/0009084 A1 * | 1/2002 | Kalkunte ....................... 370/391 |
| 2002/0024964 A1 * | 2/2002 | Baum et al. .................... 370/419 |
| 2002/0037010 A1 * | 3/2002 | Yamauchi ................ 370/395.53 |

(Continued)

FOREIGN PATENT DOCUMENTS

EP            0752796         1/1997

(Continued)

OTHER PUBLICATIONS

E. Rosen, "Multiprotocol Label Switching Architecture," Jan. 2001, Network Working Group, RFC 3031.*

(Continued)

*Primary Examiner* — Dang T Ton
*Assistant Examiner* — Ryan C Kavleski

(57) ABSTRACT

A method of handling datagrams in a network device is disclosed. The method includes the steps of receiving an incoming datagram at a port of the network device, determining a type for the incoming datagram based on fields in the incoming datagram and a destination address, adding a tag to the datagram to assist in routing the datagram, obtaining a multiprotocol label switching (MPLS) label when the datagram is a MPLS datagram, processing the datagram based on the MPLS label and the destination address and discarding or forwarding the datagram based upon the processing step. The tag is stripped from the datagram before it is sent from an egress port of the network switch.

14 Claims, 8 Drawing Sheets

U.S. PATENT DOCUMENTS

| | | | |
|---|---|---|---|
| 2002/0188871 A1* | 12/2002 | Noehring et al. | 713/201 |
| 2003/0026271 A1* | 2/2003 | Erb et al. | 370/401 |
| 2004/0030776 A1* | 2/2004 | Cantrell et al. | 709/224 |
| 2004/0190517 A1* | 9/2004 | Gupta et al. | 370/392 |
| 2004/0202171 A1* | 10/2004 | Hama | 370/395.1 |
| 2004/0205336 A1* | 10/2004 | Kessler et al. | 713/160 |
| 2004/0252722 A1* | 12/2004 | Wybenga et al. | 370/474 |
| 2004/0264374 A1* | 12/2004 | Yu et al. | 370/230 |
| 2004/0264464 A1* | 12/2004 | Wong | 370/390 |
| 2005/0018605 A1* | 1/2005 | Foote et al. | 370/230 |
| 2005/0018693 A1* | 1/2005 | Dull | 370/396 |
| 2005/0259571 A1* | 11/2005 | Battou | 370/217 |

FOREIGN PATENT DOCUMENTS

WO    WO 99/00939    1/1999

OTHER PUBLICATIONS

Semeria, Chuck, "Multiprotocol Label Switching: Enhancing Routing in the New Public Network," 2000, Juniper Networks, www.juniper.net, pp. 1-20.*

E. Rosen, "RFC 3032: MPLS Label Stack Encoding," Jan. 2001, Network Working Group, pp. 1-19.*

* cited by examiner

SINGLE AND DOUBLE TAGGING SCHEMES FOR PACKET PROCESSING IN A NETWORK DEVICE

REFERENCE TO RELATED APPLICATIONS

This application claims priority of U.S. Provisional Patent Application Ser. No. 60/482,758, filed on Jun. 27, 2003 and Ser. No. 60/527,823, filed on Dec. 9, 2003. The subject matter of these earlier filed applications is hereby incorporated by reference.

BACKGROUND OF THE INVENTION

1. Field of Invention

The present invention relates to devices, software applications and networks that utilize data that is sent or received over data communication or computer networks. In particular, the present invention is directed to processes that allow for data contained in datagrams forwarded through the computer network to be maintained and utilized in a network device. The processor and methods described provide for a scheme that allows for tagging of datagrams that allow for greater processing capabilities of the network device.

2. Description of Related Art

As computer performance has increased in recent years, the demands on computer networks has significantly increased; faster computer processors and higher memory capabilities need networks with high bandwidth capabilities to enable high speed transfer of significant amounts of data. The well-known Ethernet technology, which is based upon numerous IEEE Ethernet standards, is one example of computer networking technology which has been able to be modified and improved to remain a viable computing technology.

Based upon the Open Systems Interconnect (OSI) 7-layer reference model, network capabilities have grown through the development of repeaters, bridges, routers, and, switches, which operate with various types of communication media. Collectively, with respect to the present invention, all of these may be referred to as network devices. Switches, as they relate to computer networking and to Ethernet, are hardware-based devices which control the flow of datagrams, data packets or cells based upon destination address information which is available in each packet. A properly designed and implemented switch should be capable of receiving a packet and switching the packet to an appropriate output port at the maximum speed capability of the particular network.

Referring to the OSI 7-layer reference model discussed previously, the higher layers typically have more information. Various types of products are available for performing switching-related functions at various levels of the OSI model. Hubs or repeaters operate at layer 1, and essentially copy and "broadcast" incoming data to a plurality of spokes of the hub. Layer 2 switching-related devices are typically referred to as multiport bridges, and are capable of bridging two separate networks. Bridges can create a table of forwarding rules based upon which MAC (media access controller) addresses exist on which ports of the bridge, and pass packets that are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer 3 switches, sometimes referred to as routers, can forward packets based upon the destination network address. Layer 3 switches are capable of learning addresses and maintaining tables thereof which correspond to port mappings. Processing speed for layer 3 switches can be improved by utilizing specialized high performance hardware, and off loading the host CPU so that instruction decisions do not delay packet forwarding.

In addition, there has also been pressure from the implementers of the computer networks to have network devices to mediate traffic on the computer networks that are extremely flexible and low cost. A network switch that has certain attributes may be a perfect solution for some implementers but is not as easily used for some support solutions or for some implementers. It is also important to these implementers that the switches have long-term flexibility so that as technology changes, the network device does not become prematurely obsolete. While the prior art network devices provide many of these attributes, there is a need for a network devices that are extremely flexible and low cost.

SUMMARY OF THE INVENTION

The present invention is directed to a network device and methods that allow for data contained in datagrams forwarded through the computer network to be maintained and utilized in a network device. The processor and methods described provide for a scheme that allows for tagging of datagrams that allow for greater processing capabilities of the network device. The invention is directed to many types of data networks carrying various forms of datagrams. Specific embodiments of the invention may be directed to the tagging of packets in an Internet Protocol network.

According to one embodiment of the invention, a method of handling datagrams in a network device is disclosed. The method includes the steps of receiving an incoming datagram at a port of the network device, determining a type for the incoming datagram based on fields in the incoming datagram and a destination address, adding a tag to the datagram to assist in routing the datagram, obtaining a multiprotocol label switching (MPLS) label when the datagram is a MPLS datagram, processing the datagram based on the MPLS label and the destination address and discarding or forwarding the datagram based upon the processing step. The tag is stripped from the datagram before it is sent from an egress port of the network switch.

Additionally, the method may also include a step of inserting a tunnel label into the datagram, where the tunnel label may be inserted into the datagram prior to forwarding the datagram to a port having a throughput of at least a gigabit per second rate. Additionally, the datagram may be a packet.

In addition, the method may include determining a virtual channel label. That virtual channel maybe re-assigned based on the egress port or based on a classification made of the datagram by a fast filtering processor.

According to another embodiment, a network device for handling datagrams is disclosed. The network device includes receiving means for receiving an incoming datagram at a port of the network device, determining means for determining a type for the incoming datagram based on fields in the incoming datagram and a destination address, adding means for adding a tag to the datagram to assist in routing the datagram, obtaining means for obtaining a multiprotocol label switching (MPLS) label when the datagram is a MPLS datagram, processing means for processing the datagram based on the MPLS label and the destination address and execution means for discarding or forwarding the datagram based upon results from the processing means. The execution means strips the tag from the datagram before it is sent from an egress port of the network switch.

According to another embodiment, a network device for handling data packets is disclosed. The network device includes at least one data port interface, the at least one data port interface supporting a plurality of data ports transmitting and receiving data, a memory, the memory communicating with the at least one data port interface and a fast filtering processor, the fast filtering processor communicating with the at least one data port interface and the memory. The at least one data port interface is configured to determine a type for an incoming datagram based on fields in the incoming datagram and a destination address, to add a tag to the datagram to assist in routing the datagram, to obtain a multiprotocol label switching (MPLS) label when the datagram is a MPLS datagram, to process the datagram based on the MPLS label and the destination address and to strip the tag from the datagram before it is sent from an egress port of the network switch.

These and other variations of the present invention will be described in or be apparent from the following description of the preferred embodiments.

BRIEF DESCRIPTION OF THE DRAWINGS

For the present invention to be easily understood and readily practiced, the present invention will now be described, for purposes of illustration and not limitation, in conjunction with the following figures.

DETAILED DESCRIPTION OF PREFERRED EMBODIMENTS

Figure 1:
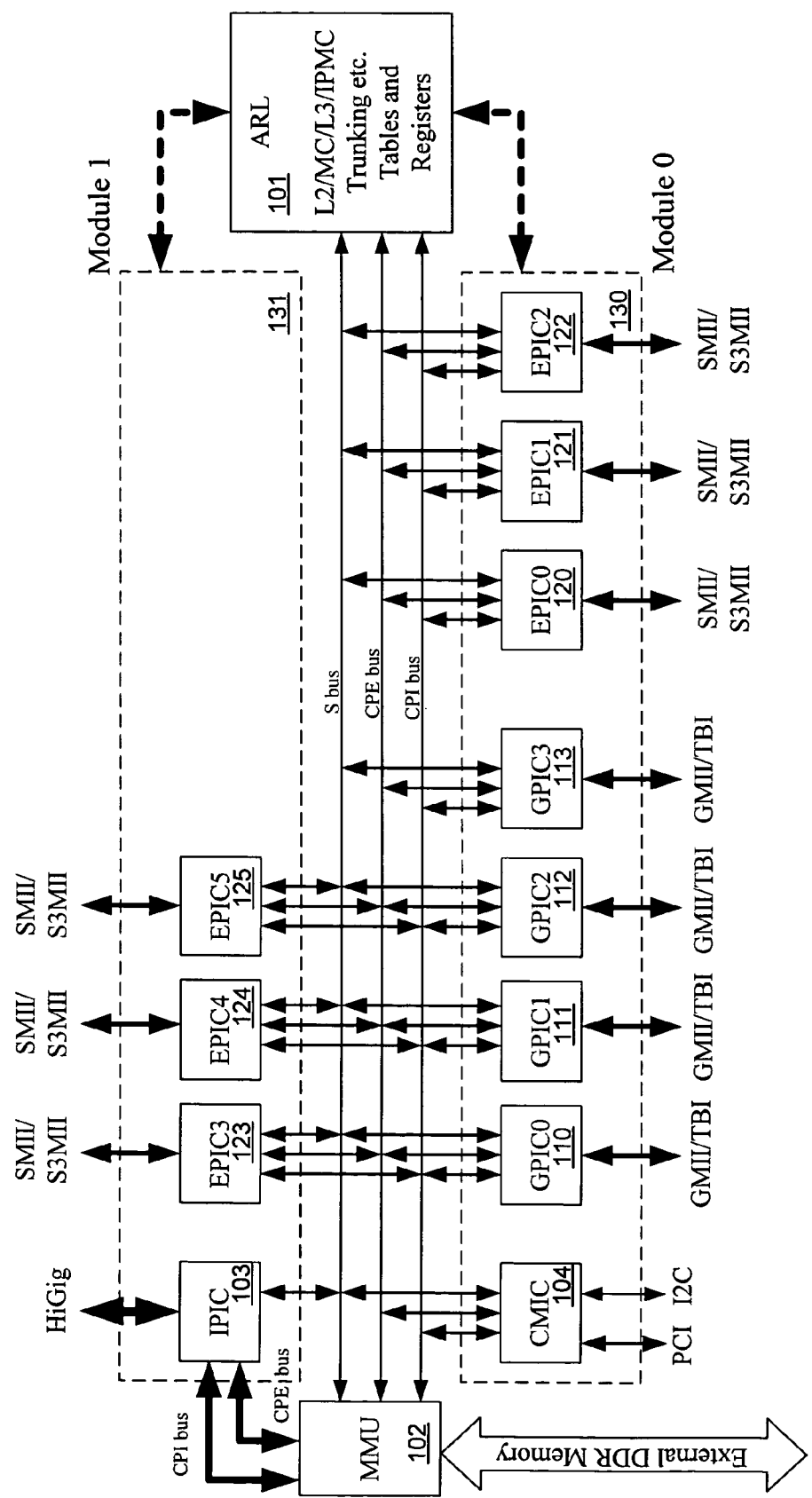
FIG. 1 illustrates a block diagram providing the basic elements of the network device, according to one embodiment of the present invention.

The present invention is directed to a network device that receives data and process that data and may forward that data onto a destination based on attributes of that data. A general schematic of the network device is illustrated in FIG. 1. The device has an address resolution module (ARL) 101 that provides support for Layer 2 (L2), Multicast (MC), Layer 3 (L3), Internet Protocol Multicast (IPMC) switching, as well as Trunking, through various tables and registers. The ARL is connected to elements of the network switch divided into different modules. The ARL is also connected through a bus made up of channels, with data transferred on the S bus which is a sideband bus and is used to transfer signals between portions of the network device.

The bus provides connections between the Memory Management Unit (MMU) and other interface modules. The interface modules include Ethernet Port Interface Controllers (EPICs) 120-125, Gigabit Port Interface Controllers (GPICs) 110-113, Interconnect Port Interface Controller (IPIC) 103, and CPU Management Interface Controller (CMIC) 104. The above components are discussed below. In addition, a Central Processing Unit (CPU) can be used as necessary to program the network device with rules which are appropriate to control packet processing. However, once network device is appropriately programmed or configured, it operates, as much as possible, in a free running manner without communicating with CPU.

As discussed above, the network device has two module IDs, with module id 0 covering the Gigabit Ethernet ports, the CMIC and EPICs 0 through 2 and with module id 1 covering the IPIC and EPICs 3 through 5. The device supports 16K MAC address with 256 Layer 2 multicast addresses and 4K VLANs. The device also supports 256 multiple spanning trees and 8 levels of Class of Service. The device also supports protocol based VLANs with priority fields and supports jumbo frames. It also supports Layer 2 Multiprotocol Label Switching (MPLS) and supports classification for multiple packet formats, including Ipv6, Ipv4, double tagged, HTLS, 802.1Q tagged, Ether II and 802.3.

The GPIC modules (110-113) interface to the Gigabit ports and on the medium side it interfaces to the TBI/GMII or MII from 10/100 and on the chip fabric side it interfaces to the bus. Each GPIC supports 1 Gigabit port or a 10/100 Mbps port. Each GPIC performs both the ingress and egress functions. The EPIC modules (120-125) interface to the 10/100-Mbit Ethernet ports and on the medium side it interfaces to the SMII/S3MII and on the chip fabric side it interfaces to the bus. Each EPIC supports an Ethernet port. A standard 802.3u MIIM interface is supported to interface with PHY devices, a standard JTAG interface for boundary scan and an LED interface to control system LEDs.

The IPIC 103 module can interface to the bus on one side and a high speed interface, such as a HiGig™ interface, on the other side. The high speed bus can be, for example, is a XAUI interface, providing a total bandwidth of 10 Gbps. The CMIC 104 block is the gateway to the host CPU. In it's simplest form it provides sequential direct mapped accesses between the CPU and the network device. The bus interface may be a 66 MHz PCI. In addition, an I2C (2-wire serial) bus interface may supported by the CMIC, to accommodate low-cost embedded designs where space and cost are a premium.

The device can also support metering, with a granularity of, for example, 64 kb/s, having bucket sizes between 4 k and 512 k. The device may also include counters based on packet number or bytes, with those counters being in-profile, out-profile or general purpose. The device also allows for rate limiting or shaping. The device includes Ingress per port rate limiting, where when the incoming bandwidth exceed a programmed threshold, the port can either send a pause frame or drop packets. The rate control is on a per port basis and support for Egress per port rate limiting.

Support may also be provided for rapid spanning tree protocol that may be deleted by the port and storm control on a per port basis. The network device may also support link aggregation, with, for example, 32 trunk groups, with up to 8 ports in a trunk group. Trunking is also supported across modules and the load may be distributed based on source MAC or IP address and/or destination MAC or IP address.

The packet buffer memory of the device may include external DDR SDRAM memory with a 128 data bit DDR SDRAM interface, configured as 4 independent channels. Each channel consists of 32 data bits and it own address and control signals. The network device supports 32 MB or 64 MB packet buffer memory size, X16 and X32 DDR SDRAM memory and 166 MHz to 200 MHz clock DDR SDRAM memory. For reliability and signal integrity, there support for CRC16 on every pointer, CRC5 on every cell and CRC32 on every frame. There is also support for a packet aging mechanism based on packet time stamp.

A fast filtering processor (FFP) is incorporated into the EPICs and GPICs, in order to accelerate packet forwarding and enhance packet flow. The FFP is essentially a state machine driven programmable rules engine. Filters are applied to packets received by the FFP, through the use of masks so that certain fields of a packet may be evaluated. The filters utilized by FFP are defined by a rules table, where that table is completely programmable by the CPU, through the CMIC. The actions taken based on the filtering of the FFP include 802.1p tag insertion, 802.1p priority mapping, IP TOS (type-of-service) tag insertion, sending of the packet to the CPU, discarding or dropping of the packet and forwarding the packet to an egress port.

The network device may also provide supports for differentiated services. The differentiated services may include metering, per ingress port and per flow, policing, per egress port, re-marking, including DSCP (IPv4 and IPv6) re-marking, re-marking based on inclusive or exclusive matches in the FFP, and classification based on incoming DSCP, and dropping, as a result of metering or filtering. A pulse may be used to refresh all meters across the network device, including ingress metering, FFP metering, egress metering and WFQ MMU meters.

There are several mechanisms for buffering of packets and advanced methods for controlling the flow of packets. These include cell-based Head Of Line (HOL) blocking prevention that is programmable and is based on the total packet memory used by each Class of Service (CoS) per port. Packet-based HOL blocking prevention is also programmable and is based on the number of packets per CoS queue for each port. These mechanisms also support tail drop for CNG for HOL of 25%, 50%, 75% and 100% and supports centralized per port HOL counter. The mechanisms may also address back pressure, per ingress port and per flow through the FFP. The latter includes pause frame support (symmetric and asymmetric IEEE 802.3x) and a jamming mechanism for half-duplex ports. A Weighted Random Early Detection (WRED) congestion control per CoS queue per port is also available. Random Early Detection is a congestion avoidance mechanism that takes advantage of TCP's congestion control mechanism. By randomly dropping packets prior to periods of high congestion, RED tells the packet source to decrease its transmission rate. Assuming the packet source is using TCP, it will decrease its transmission rate until all the packets reach their destination, indicating that the congestion is cleared.

Figure 2:
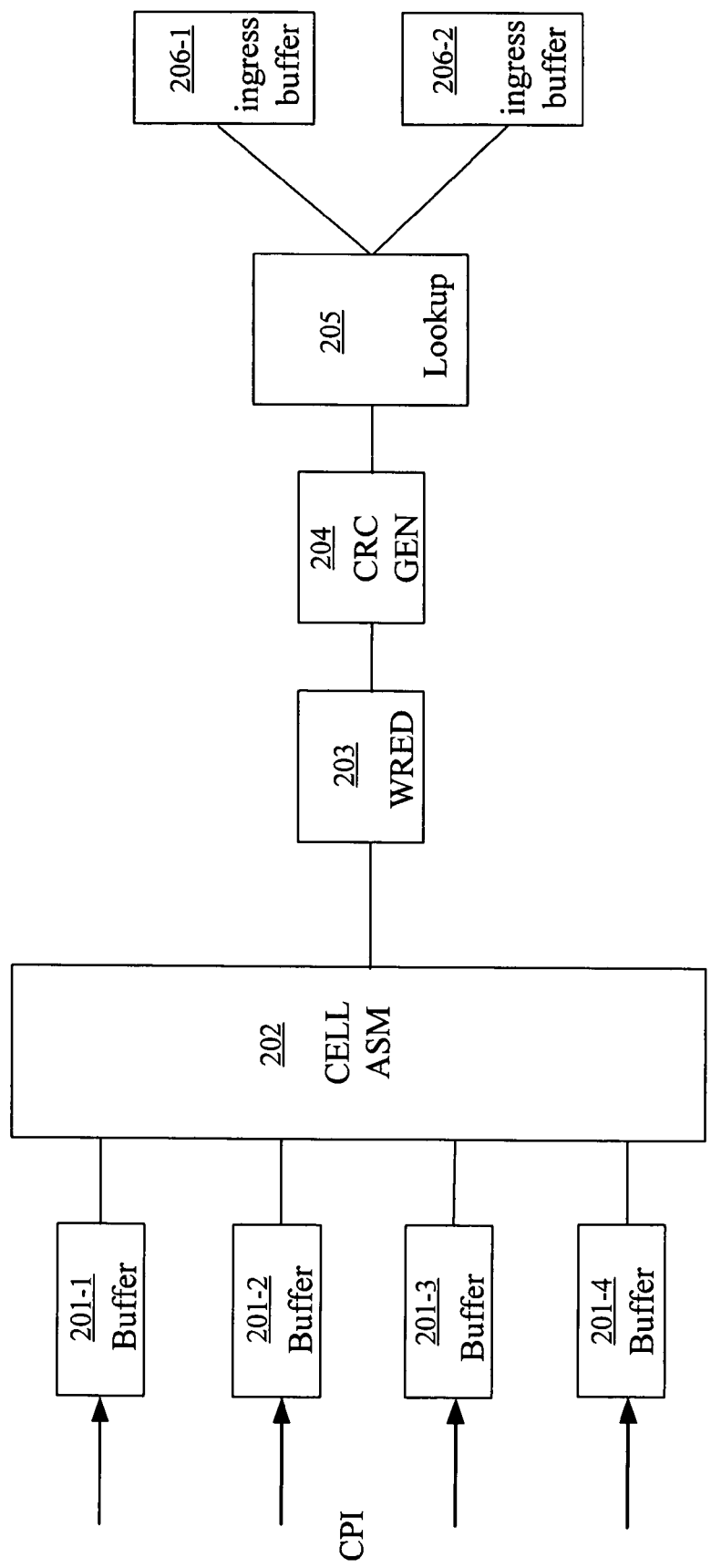
FIG. 2 provides a block diagram illustrating elements used to receive packets by the network switch, according to one embodiment of the present invention.
Figure 3:
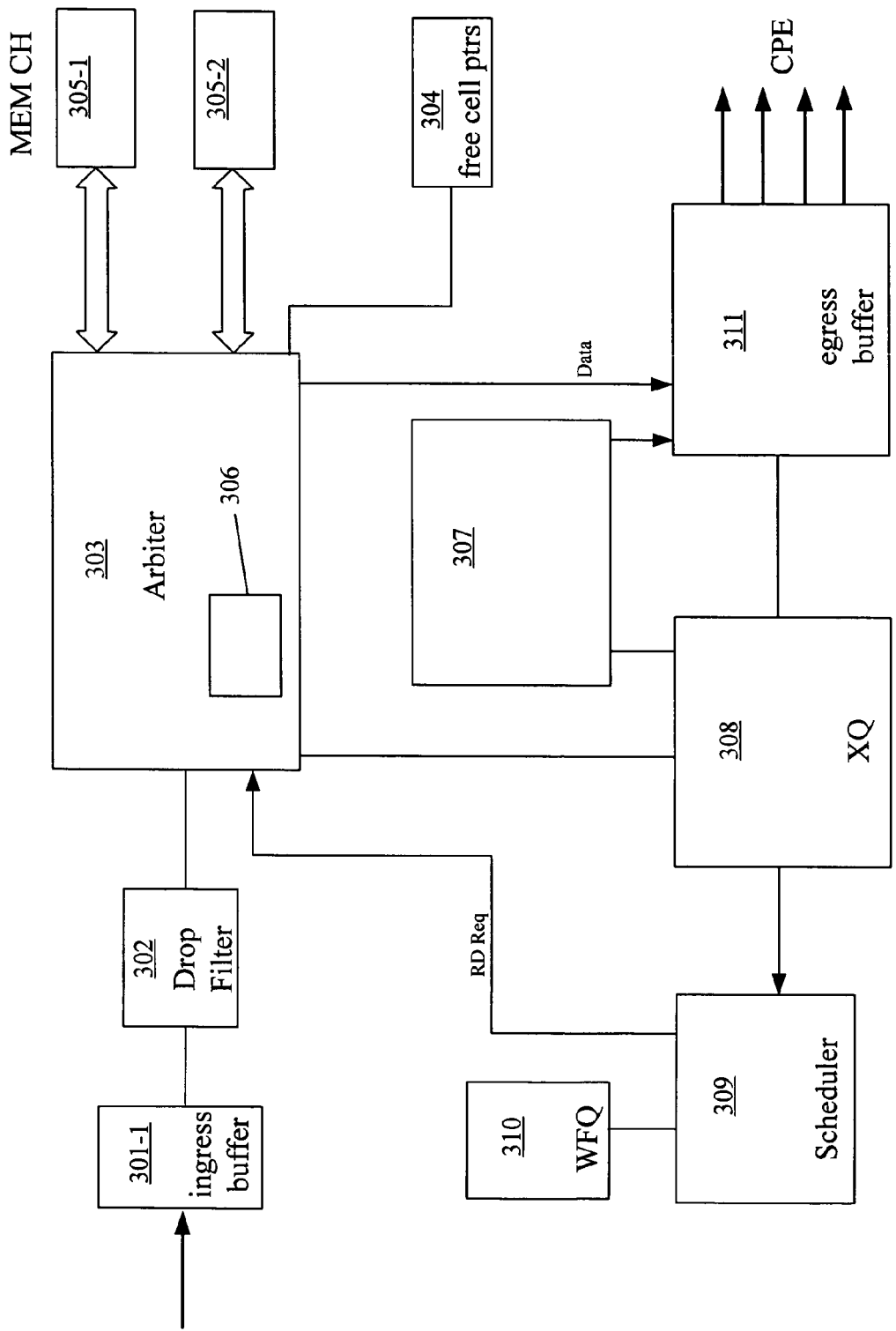
FIG. 3 provides a block diagram illustrating elements used to process packets by the network switch, according to one embodiment of the present invention.

Portions of the ingress and processing elements of the network device, according to one embodiment, are illustrated in FIGS. 2 and 3. FIG. 2 illustrates several buffers 201-1 through 201-4 for receiving packet data. The buffers pass the data to the cell assembler 202 and are then passed to the Weighted Random Early Detection (WRED) 203 module to provide congestion avoidance by dropping packets as needed based on IP precedence. The data is then passed to a for cyclic redundancy check (CRC) 204 module to detect data transmission errors. The data is subsequently passed to a lookup 205 module and then to ingress buffers 206-1 and 206-2. Thereafter, the data passes from the ingress buffer 301-1, in FIG. 3, to a drop filter 302 that may drop the packet based on programmed criteria. The packet data then passes to an arbiter 303, that has its own random access memory 306. The arbiter controls access to the memory channels 305-1 and 305-2 where packet data is stored. The arbiter communicates with a free cell pointer module 304 that provides a pointer to the next available free cells in the memory. The arbiter also is in communication with the egress queue 308 and egress buffer 311 modules. The egress buffer receives the packet data when it is ready to be sent out on the CPE interface. The egress queue module is also in communication with a scheduler 309 that schedules which packets and in what order they are sent out. The scheduler also communicates with a weighted fair queue 310 module to assist in making scheduling decisions, where those decisions result in specific read requests being sent to the arbiter.

Figure 4:
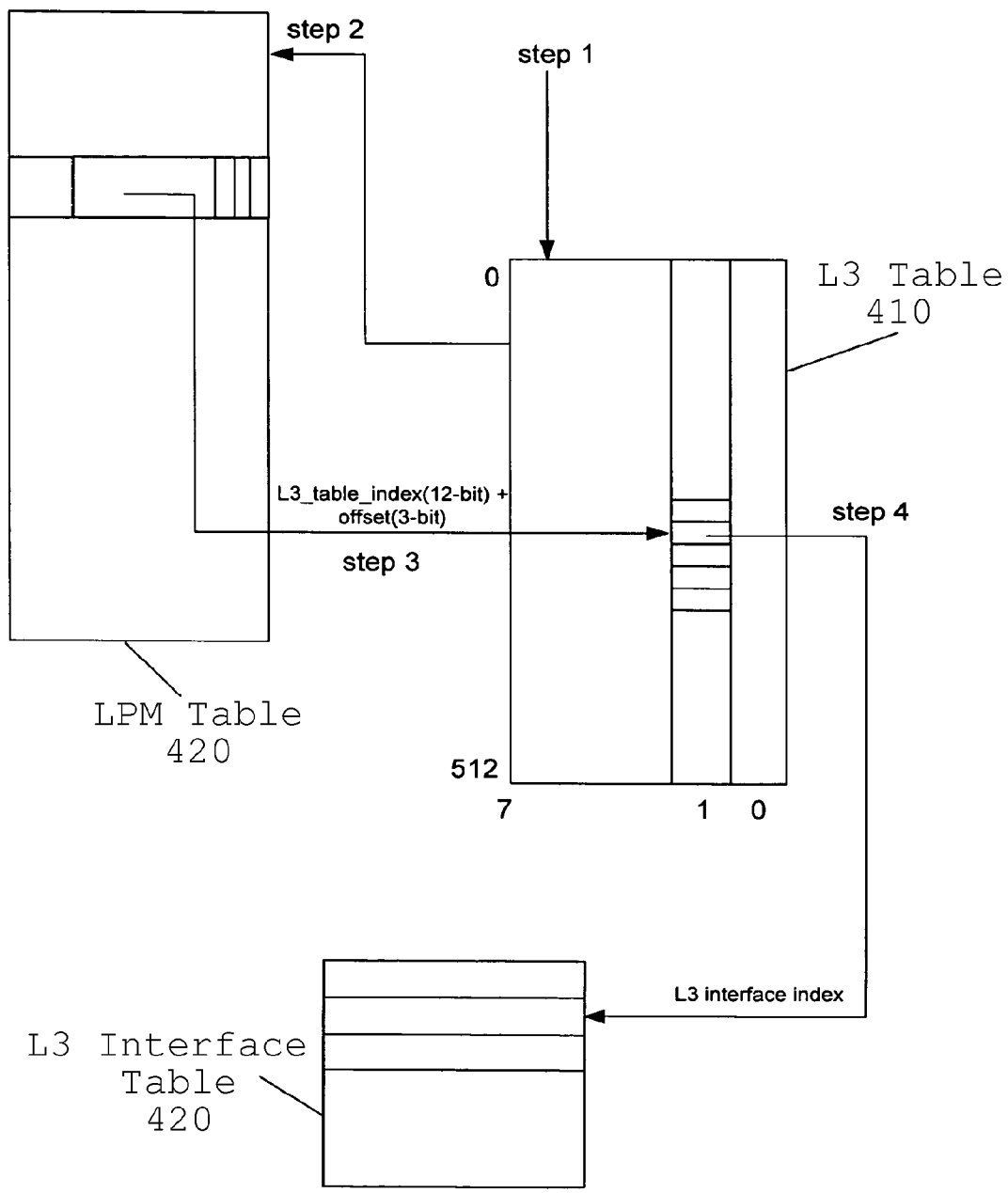
FIG. 4 provides a block diagram illustrating load balancing using tables of the network device, according to one embodiment of the present invention.

Equal Cost Multiple Path (ECMP) implementation is basically a Layer 3 load balancing application that is implemented in the network device. The process is illustrated, according to one embodiment, diagrammatically in FIG. 4 and in a flow chart in FIG. 5. In prior art devices, there was no ECMP support and thus a lookup of the path to an IP destination address would often lead to a single route, although multiple routes to the IP destination address are available.

In one embodiment of the present invention, a Layer 3 table 410 is used as a routing table (step 1). A Longest Prefix Match (LPM) table 420 is used for longest-prefix matching (step 2) to support the ECMP. The entries in the L3 table are grouped to support the multiple paths. Thus for a given IP address, a longest prefix match is made through the LPM table. In the LPM table, at the entry found through the longest prefix match is a field called the count field. The count field is populated based on the number of equal cost paths for a particular IP route. For example, if the count was "4", that would mean that the are four paths are calculated to be of equal cost for that packet to the destination IP address.

After the LPM search, an L3 pointer points to an entry in the L3 table, so that the next hop or next address can be obtained (step 3). At the same time another index is used to index the L3 interface table 430 to get the router MAC and the VLANID of the router (step 4). The L3 pointer is determined from taking the hash of the source and destination IP addresses and hashing through a 16-bit address to get the base pointer. Thereafter, the lower 8 bits are examined. Thereafter the modulo of the count is taken is taken to determine an offset and added to the lower 8 bits of the hash function. This provides an exact pointer back to the L3 table to get the route dimension.

Thus, given the that the L3 table has route information entries to the destination IP address equal to the count, the use of the above method allows for any of the equal cost paths to be chosen in a random manner. The implementation is beneficial in that multiple paths are utilized and it can be implemented to achieve diversification with minimum changes to the hardware, when compared to the prior art methods.

Figure 5:
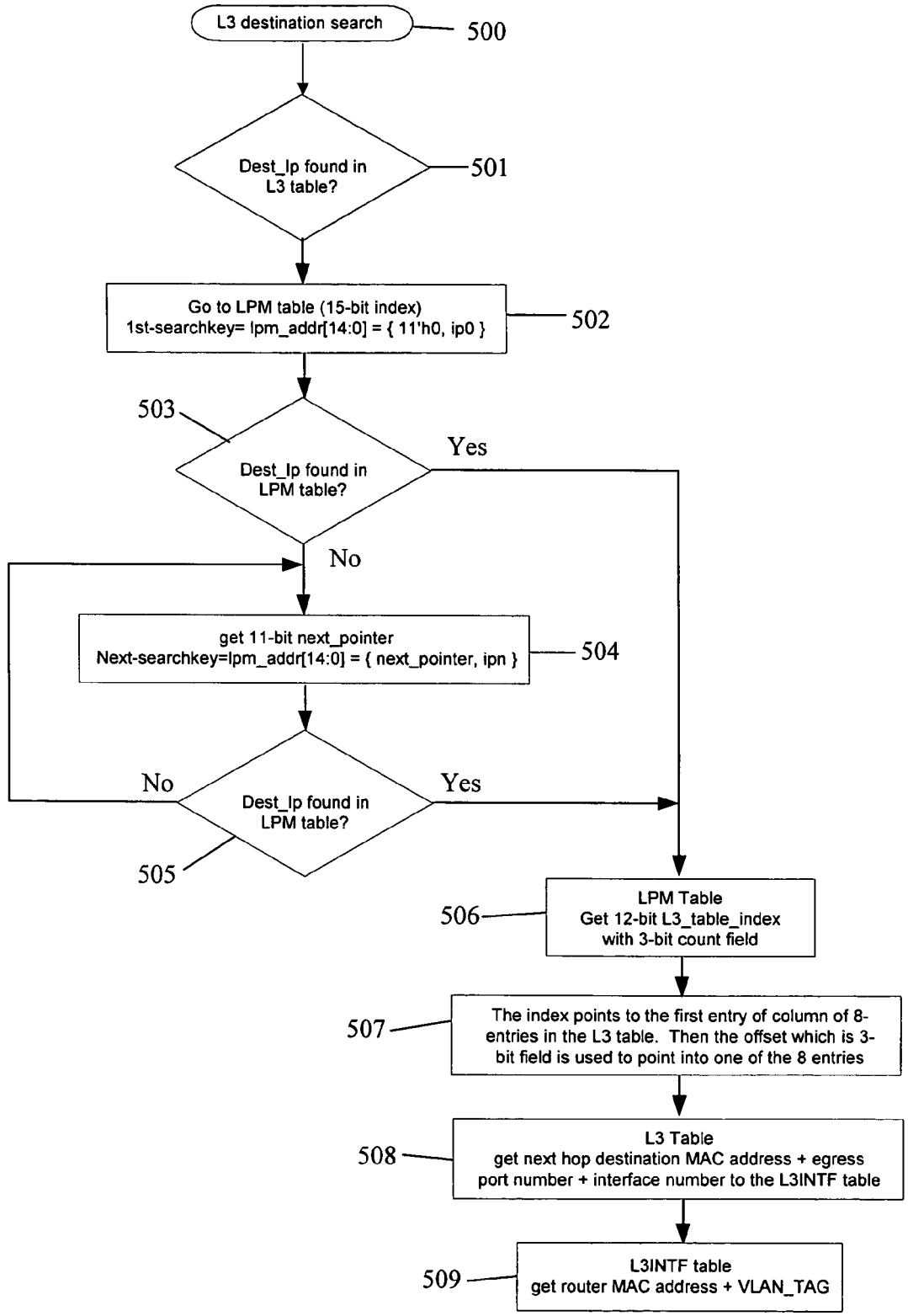
FIG. 5 illustrates a flow chart showing the process of balancing the load between paths to a destination, according to one embodiment of the present invention.

The process is also illustrated, according to at least one embodiment, in FIG. 5. An L3 destination search is begun, in step 500, and it is determined whether the destination IP address in found in the L3 table, in step 501. The LPM table is searched, step 502, and a determination is made whether the destination IP address is found therein, in step 503. Each LPM entry contains a valid bit and a stop bit. Once the LPM table address is formed as illustrated in FIG. 5., i.e. {10'h0, ip0}, the LPM table content indexed is read out and both the valid bit and the stop bit is checked for further action. If the valid bit is not set, then the LPM search is terminated and considered as a miss. There is a default IP route supported in the network device, it will be returned (if programmed by the software) on such a LPM miss termination condition. However, if the valid bit is set, but not the stop bit, the LPM search continues. The next LPM indexed is formed, in step 504, and the LPM search continues until either both valid and stop bits are set in an entry or after 8 iterations that all 32-bit IP destination address are exhausted. If the first case is true, then the LPM content is examined and point back to L3 routing table for further process. On the other hand, if later case is true, the miss termination condition and the default IP route is returned. The L3 table index is determined from the LPM table, step 506, and the next hop destination MAC address and the egress port number are obtained, steps 507-509.

The MMU and scheduling mechanism may take into account strict priority (SP) and weighted round robin (WRR) weighted fair queuing, that is programmable per CoS per port. The mechanism may also include Weighted Fair Queuing (WFQ) that employs a bandwidth minimum and maximum per CoS queue. The WFQ provides a certain minimum bandwidth to all queues for transmission, where the minimum is supplied per queue and then the remaining bandwidth, up to a configured maximum bandwidth, is distributed either by priority or in a round robin fashion. This provides for a controllable CoS behavior while not allowing starvation of low priority queues.

The scheduling can also utilize combinations of the above prioritization. Utilizing SP and WRR, high priority queues are scheduled on a strict priority basis while the remaining queues are scheduled in a WRR fashion. The configured maximum bandwidth is first supplied per SP configured queue and any remaining bandwidth, up to the configured maximum bandwidth, is distributed among the WRR configured queue. Similarly, SP and WFQ may be applied such that high priority queues are scheduled on a strict priority basis while the remaining queues are scheduled in a WFQ fashion, where a configured guaranteed bandwidth is first supplied with any remaining distributed through WFQ.

One aspect of the MMU, according to one embodiment of the present invention, is the use of a Ping/pong memory access implementation. One problem with using DRAM is random row cycle time due the random nature of egress cell requests. The access time is often 60 ns ($t_{RC}$) for 64 byte packets. The maximum worst case of Ethernet bandwidth is then (64+20)*8/(2*60)=5.6 Gb/s. This is the case even with 10,000 bit IO running at 10 GHz.

One possible solution to this lag might be to use RAM with lower $t_{RC}$, but that would be more expensive and thus raise the cost of the network device. Alternately, according to an embodiment of the present invention, a dual port memory scheme may be emulated that achieves a maximum Ethernet bandwidth of 11.2 Gb/s.

In order to emulate a dual port memory, a ping/pong concept is employed. Instead of using one logic memory block 128 bits wide, two logic memory blocks 64 bits wide may be employed, for example. A read request selects a memory block first (ping) and write use of the other one (pong) occurs. For non-fixed cell sizes, read cells to the same destination could be out of sequence, so this must be especially addressed. The process also provides a service guarantee in that even if all reads for some time must go to memory block 0, the full read bandwidth is available (i.e. $t_{RC}$ is limited).

In order to implement the Ping/pong memory access, frames are stored as a linked list of cells, with the pointer to the next cell written together with the current cell. The process makes write decisions just-in-time, with no way of knowing where the next cell will be written. This can create a problem when the current cell of a frame is written, the location of the next cell write also has to be written, but this location is not yet known. As a solution, two possible next pointers are written into the current cell, with a 1-bit record kept internally per cell location, updated after the next cell was written, indicating which next pointer the next cell was actually used.

In other implementations of the MMU, an improved multicast pointer system is developed. In the prior art implementation, memory is shared. Only one copy of a multicast frame is stored, as opposed to storing a copy per destination. Thereafter, for a multicast packet, it is necessary to keep track of when the resources allocated for this frame can be released. Usually done by using a counter per cell, initialized when the cell is written, and decremented every time the cell is read. When the count reaches zero, the resource may deallocated. This scheme presents a problem when using large external memories as frame buffers. The number of cells can be huge so that the required memory for storing the counts can be appreciable. For example, if the number of cells is 200 k and the count is 6 bits in length, the required memory for storing the counts would be 1.2 Mbit or approximately 3.1 mm$^2$ of space on the chip. Alternatively, the count may be embedded in the cell, but this requires extra bandwidth to update the count after each read.

The present invention, according to one embodiment, utilizes a pointer based system, where a multicast pointer is embedded per frame. With the multicast counts being stored in a shared structure, this limits the total number of concurrent multicast flows. In the case of the example discussed above, those concurrent multicast flows would be limited to less than 8 k.

In addition, a weighted fair queuing implementation may also be used with the MMU of the present invention. One communication channel is shared between several traffic classes in a predetermined manner to guarantee a minimum bandwidth per traffic class. The normal implementation of a weighted fair queue is using current packet size to determine which is next in line for transmission, based on a calculated end transmission time for each packet at the head of the queue. Knowing a packet size up-front is very expensive from a memory allocation perspective. For example for 200 k packets times a size entry of 14 bits equals 2.8 Mbit or approximately 7.3 mm$^2$ of space.

One solution to this problem, utilized in some of the embodiments of the present invention, is to use a leaky bucket approach, with the leak being equal to the required minimum bandwidth. The size of cells later being read from memory and sent to the egress port are additions to the bucket. Thus, knowledge of the frame size info is not required up-front and a minimum bandwidth per traffic class can be guaranteed.

The MMU also incorporates multi-threading of the high-capacity or HiGig port using two independent threads to feed the 10 Gb HiGig port, according to one embodiment. The prior problem concerns the use of external memory and embedding the next cell pointer in each memory cell. The time that it takes from one cell being read until the address of the next cell is available, limits the maximum bandwidth for a given egress port flow to below 10 Gb/s. Storing the next cell pointer internally would require 200 k cells*17 bits=3.4 Mbit or ~8.8 mm$^2$. As a solution, the 10 Gb/s flow is separated into two or more independent threads. In order to not get out-of-sequence packets, the threads have to map unique flows, in this case distinguished by a source port number.

The present invention also addresses the following problem, according to one embodiment. For some configurations, such as using slow DDR333 SDRAM, the memory system will be blocked. Normally this would require the MMU to start dropping packets immediately, leading to poor performance, even if the overload is only coming in bursts. The solution, implemented in embodiments of the present invention, is to add an ingress buffer, which is able to absorb the burstiness, signaling to the MMU egress when above a programmed watermark. This allows the MMU egress to stop transmitting new frames, but keeping ongoing frames running, until below the watermark again.

The network device also has many features supporting Layer 3 switching. For unicast L3 switching, there are 512 L3 interfaces, 4 k host table, 16 k LPM tables and ECMP support for up to 8 paths. There is also the ability to support load distribution for L3 switching across a trunk group and support for L3 entry insertion and deletion to assist routing software to perform faster updates. The IP multicast table supports 256 entries and contains Source Port/TGID, TTL threshold, CoS, L2 and L3 bitmaps.

With respect to IPMC packet replication, both GE and FE ports support 256 IPMC groups. Up to 32 VLANs per port for replication in GE ports and 8 VLANs per port for replication in FE ports are supported. The packets reside in the MMU until the whole replication is done, but may be suspended to serve higher priority packets.

The IPMC replication flow occurs as follows. The IP multicast group number is used to index into the IP multicast group vector table. Each bit position in this table is the index into the IP multicast VLAN ID table. The VLAN ID table stores the VLAN IDs corresponding to each bit position in the IP Multicast Group Vector Table entry. The packet is replicated and forwarded onto each VLAN ID in the IP multicast VLAN ID table, for which a bit is set to "1" in the IP multicast group vector table. If the incoming VLAN ID of the packet is the same as the VLAN ID from the VLAN ID table, the packet is L2 forwarded. If the untagged bit for this port is set, then the packet will be sent out as untagged. Otherwise, it is sent out as tagged. There is an option to replace the SA of the packet with the router SA even for L2 IPMC switching. If the incoming VLAN ID of the packet is different, the packet is routed on to the outgoing VLAN. The IP TTL is decremented and the IP checksum is recalculated. The SA of the packet is replaced with the IP Multicast router MAC address.

IPMC requires several tables that are required to implement the operation; which portions will be implemented in the MMU; which portions will be implemented in the egress module.

IPMC packet replication is supported on both Gigabit ports and Fast Ethernet ports. However, the requirements are slightly different between different type of ports. For Gigabit ports, the maximum number of VLANs supported for replication is 32. For Fast Ethernet ports, the maximum number of VLANs supported for replication is 8. Both Gigabit ports and FE ports supports 256 IPMC group.

The following register, as provided in TABLE 1, is used in each port, according to one embodiment:

TABLE 1

| Fields | Regs Name | # of Bits | Description |
|---|---|---|---|
| TTL Threshold | TTL | 8 | The TTL threhsold for the outgoing Multicast packet. Packet having TTL threshold below this are not L3 switched |
| MAC Address | MAC SA | 48 | The outgoing multicast packet is replaced with this source MAC address |

Each GPIC has one such register and each EPIC has eight, one for each FE port.

The following IPMC group vector tables are also used in some embodiments, with the table in TABLE 2 being used in the GPICs and the table in TABLE 3 being used in the EPICs.

TABLE 2

| Entries | Bitmap (32 bits) | | | | | | | | | | | | | | | | |
|---|---|---|---|---|---|---|---|---|---|---|---|---|---|---|---|---|---|
| 0 | 0 | 0 | 1 | 0 | 1 | 0 | 0 | 0 | 1 | 0 | 0 | 0 | 0 | 0 | 0 | 1 | 0 | 1 |
| 1 | 1 | 1 | 0 | 0 | 0 | 0 | 1 | 0 | 1 | 0 | 0 | 0 | 1 | 0 | 0 | 1 | 0 | 0 |
| . | | | | | | | | | | | | | | | | | | |
| 255 | | | | | | | | | | | | | | | | | | |

| Entries | Bitmap (32 bits) | | | | | | | | | | | | | | | |
|---|---|---|---|---|---|---|---|---|---|---|---|---|---|---|---|---|
| 0 | 0 | 0 | 0 | 0 | 1 | 0 | 0 | 0 | 0 | 0 | 0 | 1 | 0 | 1 | 0 | 0 |
| 1 | 0 | 1 | 0 | 0 | 0 | 1 | 0 | 0 | 0 | 0 | 0 | 0 | 1 | 0 | 0 | 1 |
| . | | | | | | | | | | | | | | | | |
| 255 | | | | | | | | | | | | | | | | |

TABLE 3

| Entries | FE 0 | | | | | | | | FE 1 | | | | | | | | ... | FE 7 | | | | | | |
|---|---|---|---|---|---|---|---|---|---|---|---|---|---|---|---|---|---|---|---|---|---|---|---|---|
| | Bitmap (64 bits) | | | | | | | | | | | | | | | | | | | | | | | |
| 0 | 0 | 1 | 0 | 1 | 0 | 0 | 0 | 1 | 0 | 0 | 0 | 0 | 0 | 0 | 1 | 0 | ... | 0 | 0 | 0 | 1 | 0 | 1 | 0 | 0 |
| 1 | 1 | 0 | 0 | 0 | 0 | 0 | 1 | 0 | 1 | 0 | 0 | 0 | 1 | 0 | 0 | 1 | 0 | ... | 0 | 0 | 0 | 0 | 1 | 0 | 0 | 1 |
| . | | | | | | | | | | | | | | | | | ... | | | | | | | |
| 255 | | | | | | | | | | | | | | | | | ... | | | | | | | |

In addition, each GPIC has one IPMC Group Vector Table (256*32=8K bits) and each EPIC has one IPMC Group Vector Table (256*8*8ports=16K bits).

Each GPIC has one IPMC VLAN ID Table (32*12=384 bits). Each EPIC has one IPMC VLAN ID Table (8*12*8ports=768 bits). In order for the MMU to lookup the replicate count, the following tables will be needed inside the MMU: Replicate Count Table (for all Gig ports): 256 IPMC group*4 ports*5 bit=5K bits and Replicate Count Table (for all FE ports): 256 IPMC group*48 ports*3 bit=36K bits. Besides the Replicate Count Table, the MMU also needs to keep track of the number of copies (copy count) that the packet has been duplicated.

Figure 6:
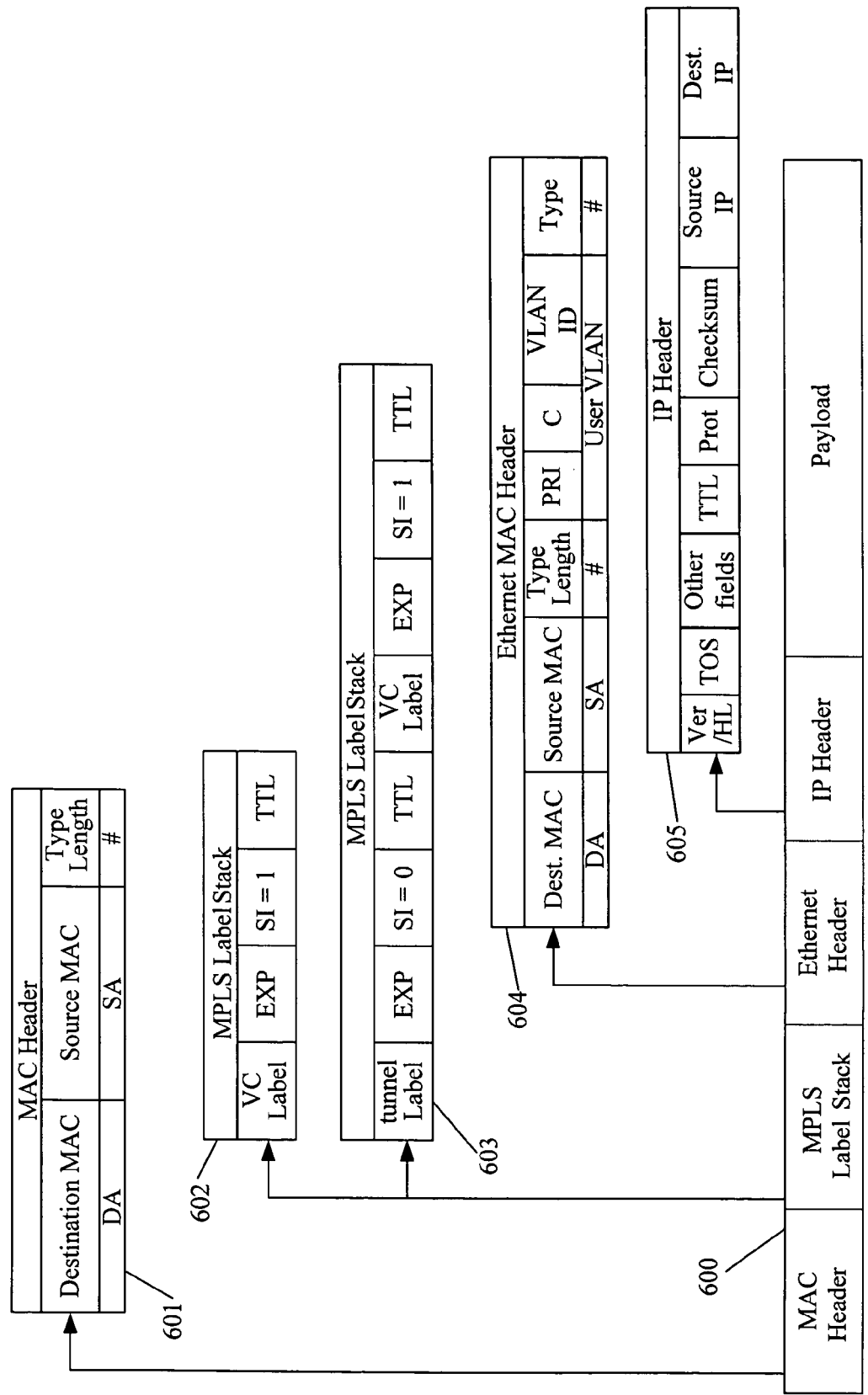
FIG. 6 illustrates a packet format used in label switching, according to one embodiment of the present invention.

The network device, according to certain embodiments, also supports double tagging of packets. The device supports an unqualified learning/forwarding mode and 802.1Q double tagging. The HTLS packet format is supported including 256 VC labels. VC labels may be re-marked in the FFP and a tunnel label may also be inserted in the HTLS header. The packet format is illustrated in FIG. 6. The packet 600 has a MAC header 601, a MPLS Label Stack 602 or 603, based on whether the tunnel label is included, and both a Ethernet MAC header 604 and an IP header 605.

In double tagging HTLS, HTLS is on top of the double tagging because translation to a SPVID is performed and within a switch, SPVID is used to route a packet. Thus a translation from a HTLS domain to a double tagging domain allows for the packet to be forwarded based on the SPVID. The VC label information is carried into the chip and when the packet is sent to the uplink, that VC label information is used to form the HTLS header. The packet is sent out with the HTLS header and all unique customer packet information.

Figure 7:
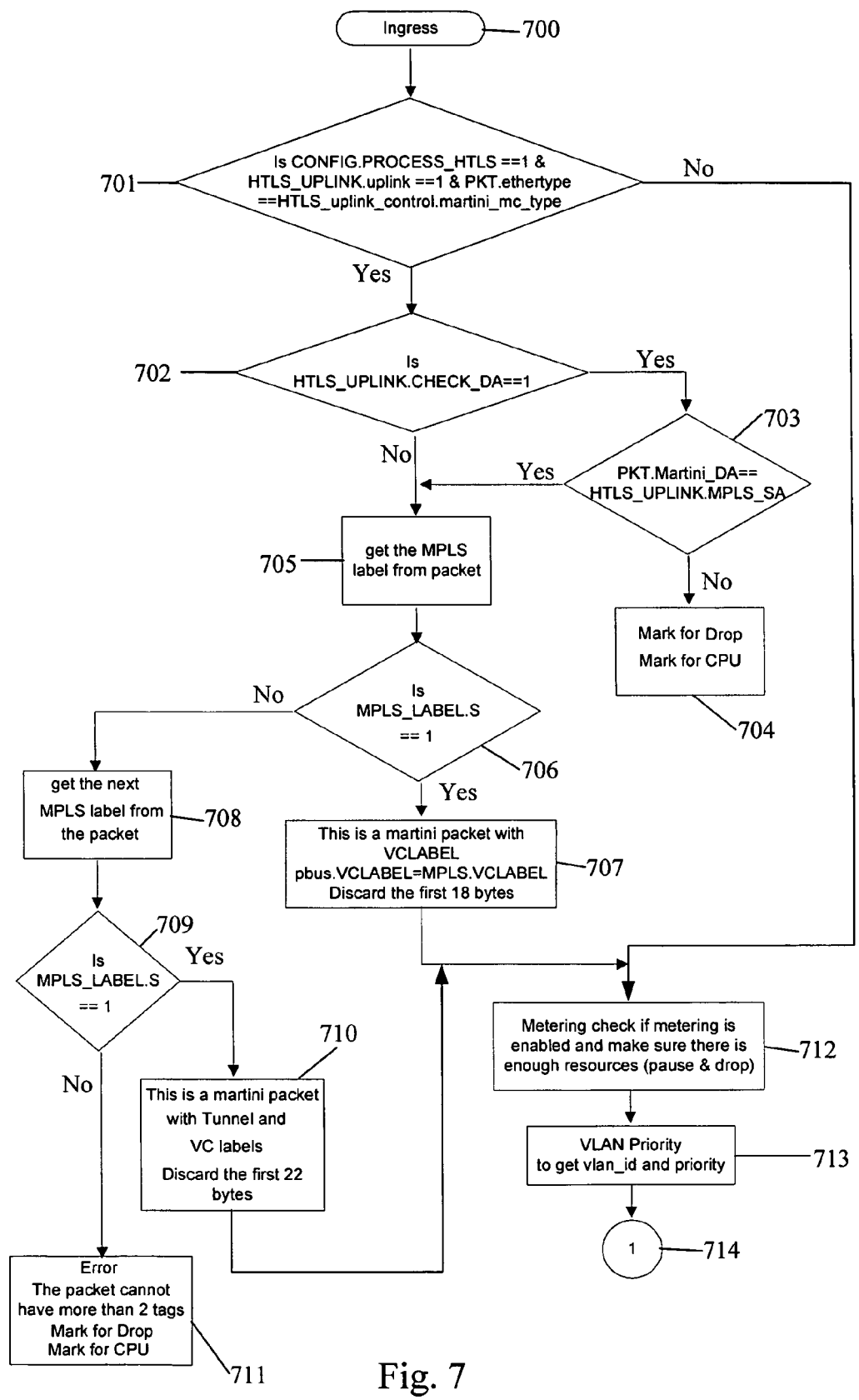
FIG. 7 illustrates a flow chart showing packet flow at the uplink's ingress, according to one embodiment of the present invention.
Figure 8:
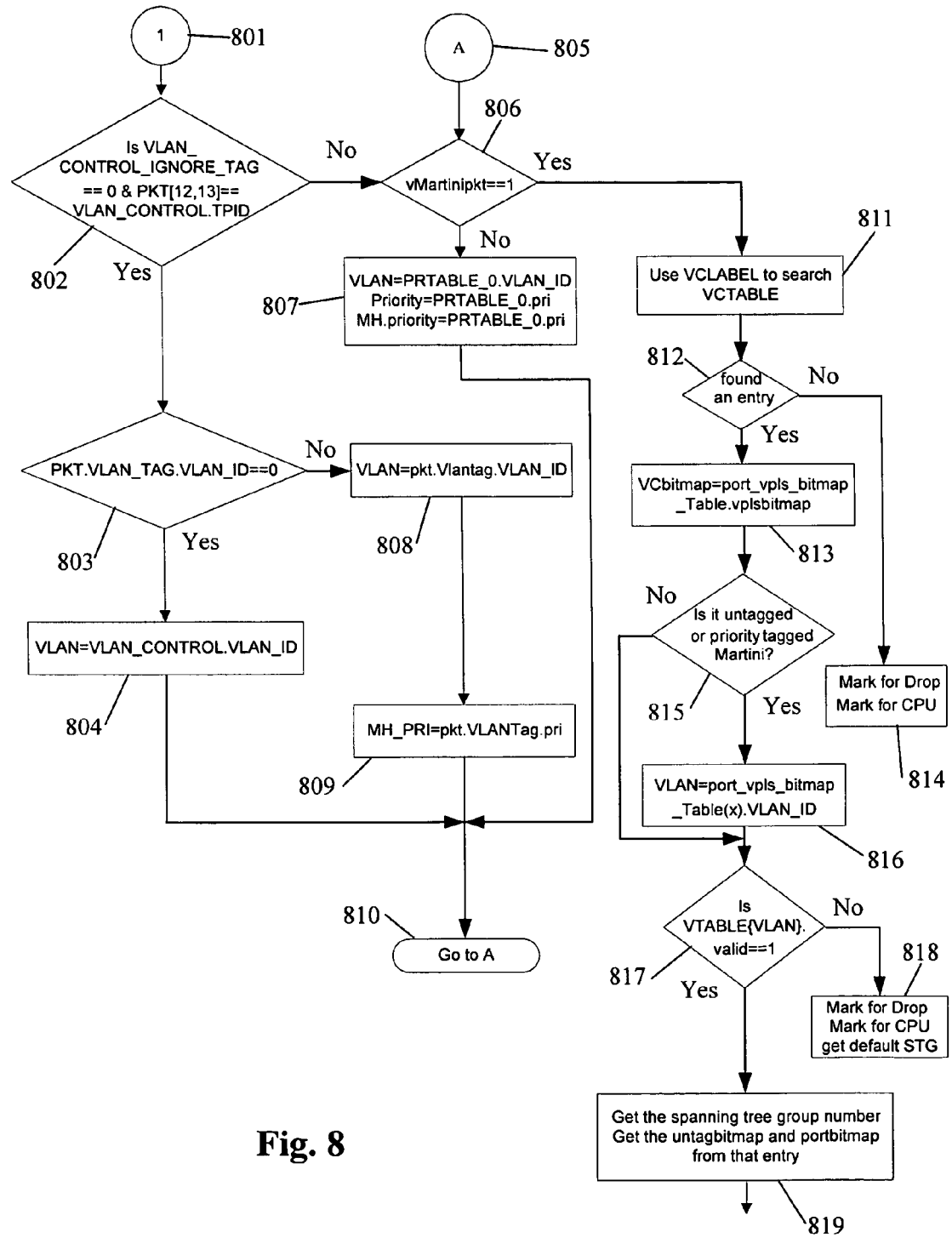
FIG. 8 illustrates a flow chart showing egress processing of packets, according to one embodiment of the present invention.

One example of the process of handling HTLS packets is illustrated in FIGS. 7 and 8. At the ingress, step 700, it is determined what type of packet is being received 701. If the type of the packet is not one a set of types, the flow passes to 712 where it is checked to determine whether metering has been enabled and whether the packet is a controlled packet or has reserved addresses 713. Thereafter the packet data is forwarded to get a VLAN ID and priority 714. If the packet is one of a certain type, then flow passes to 702 to check the uplink destination address. If that is not the case, the destination address is compared to the uplink source address 703, where the packet is marked to be dropped if the addresses are not the same 704. Thereafter, the MPLS label is obtained from the packet 705 and a portion of the label is examined 706. Based on that decision, it is determined whether the martini packet is VLAN aware 707 or whether the next MPLS label should be obtained from the packet 708. Based on that label 709, either an error is established and the packet is dropped 711 or it is determined that the packet is VLAN unaware. Thereafter, the process of obtaining a VLAN ID and priority are obtained in steps 801-819.

The HTLS format may be translated into other formats, with the tagging occurring when the packet arrives at the chip and then stripped off on the uplink port. The chip provides the wrapper itself and tables and registers are provided to support HTLS. Double tagging occurs when a packet is sent out with two tags. In HTLS, all packets within the chip have two tags. In addition, a different VC label may be assigned to a packet. The VC label may be assigned by default on a per port basis or the FFP may be sued to classify the packet and assign a new VC label for packets coming in from the same port or path. Thus, the VC label information is also carried on top of the double tags inside the chip. On egress, based on the VC label and information in the register, the packet is sent out with one label or two labels in HTLS.

One label technically is a VC label and the optional label is called a tunnel label. The tunnel label can be used to send the packet out on Gig port with the HTLS header. Thus, when the packet is ready to be sent out, the MPLS header may be formed with either the VC label or the VC label plus the tunnel label and sent out. When a packet is received on the Gig port, the device has the ability to parse the MPLS header and recognize that header.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those skilled in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method performed by a network device, comprising:
receiving an incoming datagram at a port of a network device;
comparing a destination address of an inner header of the datagram to a source address of an outer header of the datagram;
dropping the datagram if the destination address of the inner header is not the same as the source address of the outer header;
if the destination address of the inner header is the same as the source address of the outer header, determining, based on a multiprotocol label switching (MPLS) label stack included in the datagram, a number of tags in the MPLS label stack;
if it is determined that the number of tags in the MPLS label stack is one, discarding a first number of bytes from the datagram;
if it is determined that the number of tags in the MPLS label stack is two, discarding a second number of bytes from the datagram; and
if it is determined that the number of tags in the datagram is greater than two, dropping the datagram.

2. A method as recited in claim 1, wherein the number of tags in the MPLS label stack is two, further comprising obtaining a tunnel label from the first tag in the MPLS label stack.

3. A method as recited in claim 2, further comprising obtaining a virtual channel (VC) label from the second tag in the MPLS label stack.

4. A method as recited in claim 1, wherein the number of tags in the MPLS label stack is one, further comprising obtaining a virtual channel label from the tag in the MPLS label stack.

5. A method as recited in claim 4 further comprising assigning a new virtual channel label based on a classification made of the datagram by a fast filtering processor.

6. A method as recited in claim 1, wherein the receiving of the incoming datagram comprises receiving an incoming data packet.

7. An apparatus comprising: means for receiving an incoming datagram at a port of the network device;
   means for comparing a destination address of an inner header of the datagram to a source address of an outer header of the datagram;
   means for dropping the datagram if the destination address of the inner header is not the same as the source address of the outer header;
   means for determining, based on a multiprotocol label switching (MPLS) label stack included in the datagram, a number of tags in the MPLS label stack, if the destination address of the inner header is the same as the source address of the outer header;
   means for discarding a first number of bytes from the datagram if the number of tags in the MPLS label stack is determined to be one;
   means for discarding a second number of bytes from the datagram if it is determined that the number of tags in the MPLS label stack is two; and
   means for dropping the datagram if it is determined that the number of tags in the MPLS label stack is greater than two.

8. An apparatus as recited in claim 7, further comprising:
   means for obtaining a tunnel label from a first tag in the MPLS label stack of the datagram if it is determined that the number of tags in the MPLS label stack is two.

9. An apparatus as recited in claim 7, wherein the incoming datagram comprises an incoming data packet.

10. An apparatus, comprising:
    at least one data port interface configured to support a plurality of data ports, the plurality of data ports configured to transmit and receive data;
    a memory configured to communicate with the at least one data port interface; and
    a fast filtering processor configured to communicate with the at least one data port interface and the memory,
    wherein the at least one data port interface is configured to:
    compare a destination address of an inner header of the datagram to a source address of an outer header of the datagram;
    drop the datagram if the destination address of the inner header is not the same as the source address of the outer header;
    if the destination address of the inner header is the same as the source address of the outer header, determine, based on a multiprotocol label switching (MPLS) label stack included in the datagram, a number of tags in the MPLS label stack;
    discard a first number of bytes from the datagram if it is determined that the number of tags in the MPLS label stack is one;
    discard a second number of bytes from the datagram if it is determined that the number of tags in the MPLS label stack is two; and
    drop the datagram if it is determined that the number of tags in the MPLS label stack is greater than two.

11. An apparatus as recited in claim 10, wherein the at least one data port interface is configured to obtain a tunnel label in the first MPLS label of the datagram if the number of tags in the MPLS label stack is determined to be one.

12. An apparatus as recited in claim 11, wherein the at least one data port interface is configured to process the datagram based on the tunnel label.

13. An apparatus as recited in claim 10, wherein the at least one data port interface is configured to determine a virtual channel label from a tag in the MPLS label stack.

14. An apparatus as recited in claim 9, wherein the fast filtering processor is configured to assign a new virtual channel label based on a classification made for the datagram.

* * * * *

UNITED STATES PATENT AND TRADEMARK OFFICE
CERTIFICATE OF CORRECTION

| | |
|---|---|
| PATENT NO. | : 7,974,284 B2 |
| APPLICATION NO. | : 10/874550 |
| DATED | : July 5, 2011 |
| INVENTOR(S) | : Yih-Chuan S. Chen et al. |

It is certified that error appears in the above-identified patent and that said Letters Patent is hereby corrected as shown below:

In column 14, line 33, in claim 14, delete "9," and insert -- 13, --, therefor.

Signed and Sealed this
Thirtieth Day of August, 2011

David J. Kappos
*Director of the United States Patent and Trademark Office*